May 19, 1959  R. PARVIN ET AL  2,886,991
BEAM FORMING DEVICE
Filed July 19, 1955  3 Sheets-Sheet 1
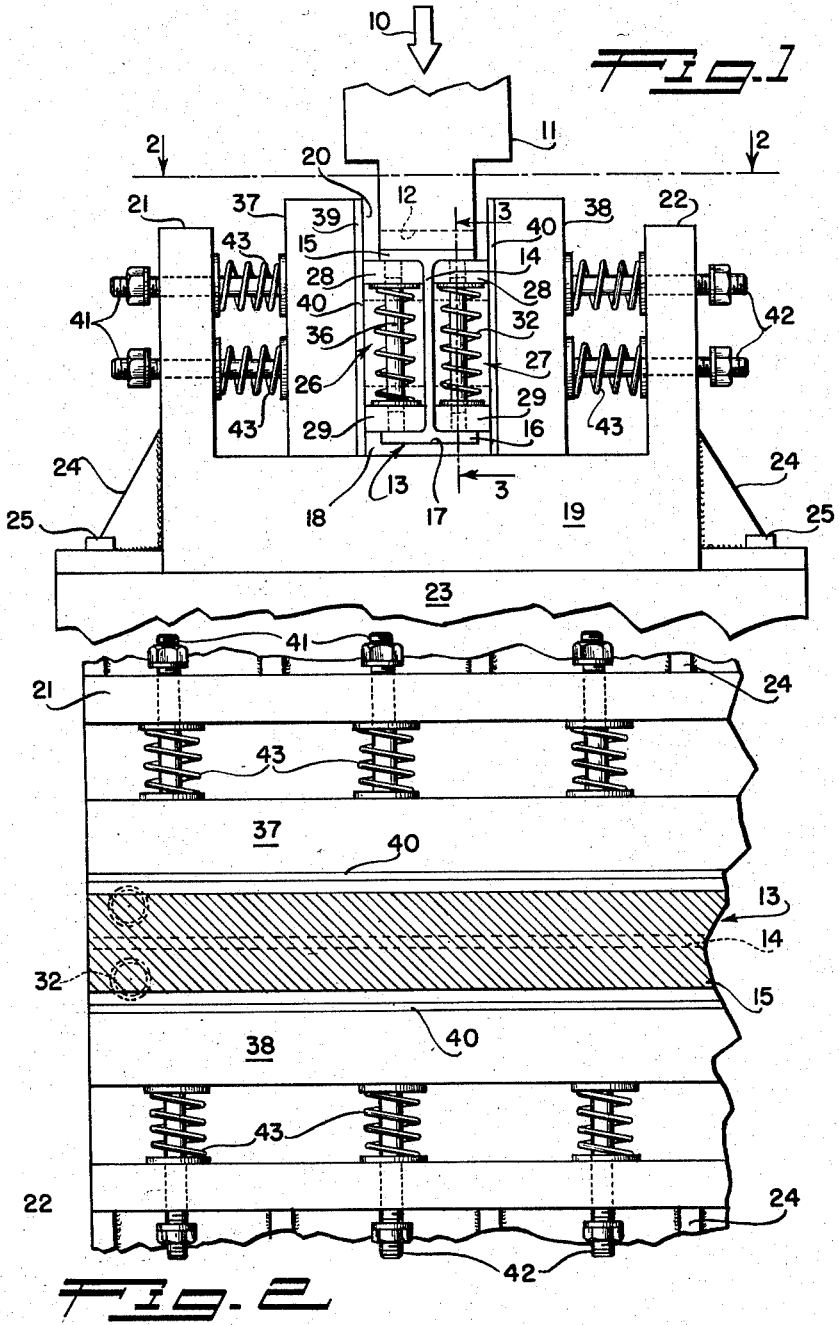
INVENTORS
ROBERT PARVIN
KEITH A. WILHELM
By George Sullivan
Agent

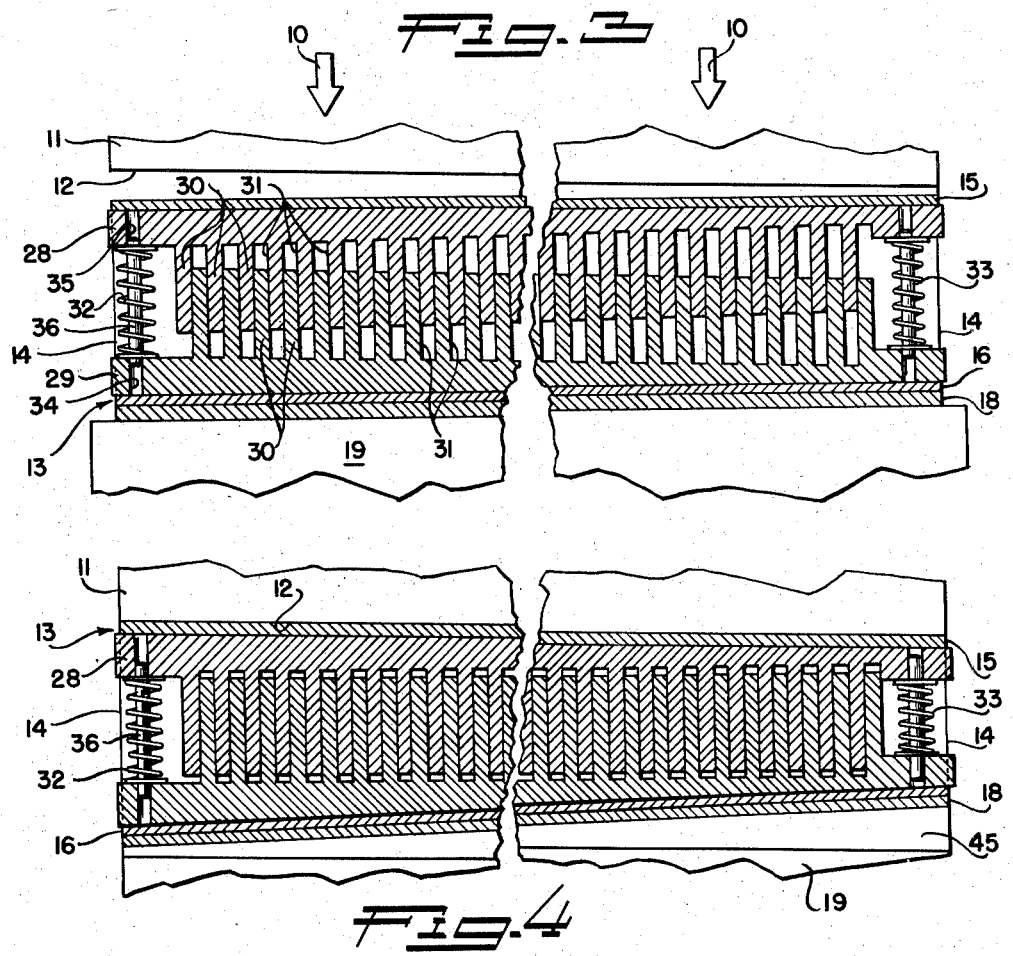
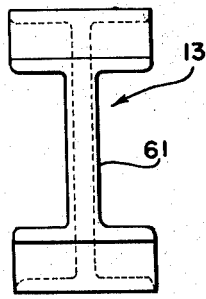

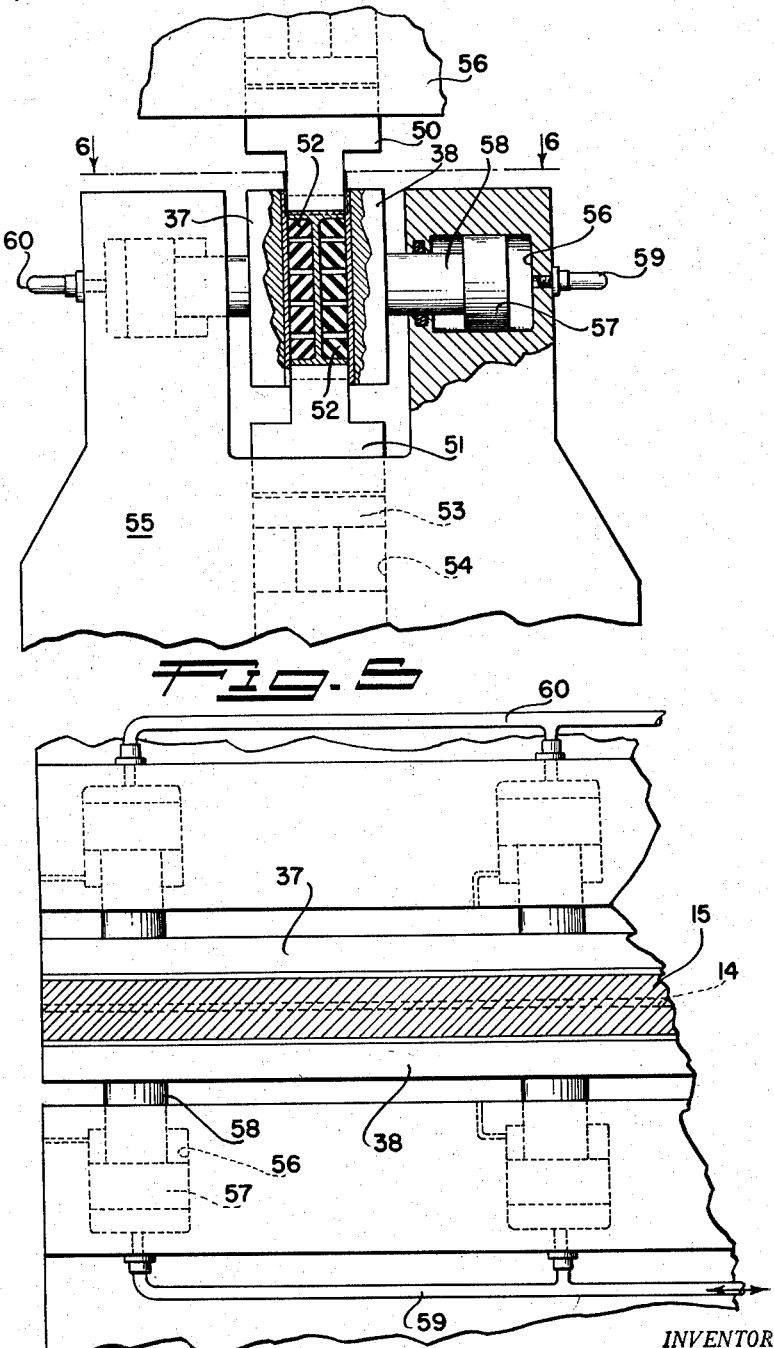

United States Patent Office 2,886,991
Patented May 19, 1959

2,886,991

BEAM FORMING DEVICE

Robert Parvin, Los Angeles, and Keith A. Wilhelm, Encino, Calif., assignors to Lockheed Aircraft Corporation, Burbank, Calif.

Application July 19, 1955, Serial No. 523,058

6 Claims. (Cl. 78—61)

This invention relates to material forming devices for providing tapered structural members from simple extruded shapes. More particularly the extruded shapes, such as I beams, T and Z sections are tapered by means of the present invention employing compression forming techniques.

In many industries, such as the aircraft and automotive industry, a need exists for a variety of tapered beam shapes for use in airframe and auto body construction. It is desirable to produce these tapered shapes from standard beam structures. Their production requires that maximum structural rigidity be maintained without excessive material weight and that the process be simple and economical. One conventional method of producing a tapered beam is to build a beam assembly to form the desired taper. This method comprises, in general, cutting a portion of sheet metal to the taper form and employing this portion of sheet metal as a web of the beam assembly. A pair of flanges following the taper contour is attached to the web by means of bolts or rivets. Producing a tapered beam assembly in this manner is costly and results in weighted construction.

Another conventional method of producing tapered beams has been to machine a beam from a forging, bar stock, or an extrusion. This method has the obvious disadvantage of high machining costs and excessive material weight.

Another conventional method of producing tapered beams is to use an extrusion with a thickened section or bulb, in the center of the web. A cold rolling process forges the bulb to a predetermined thickness which causes the flanges to move apart producing a gradual taper in the height of the beam. This particular method is simple but has three distinct disadvantages. First, the beam is extruded with the bulb, and the bulb must be machined from the entire beam after forming. Second, the shape and size of the bulb are critical and any variation in the bulb, or in the rolling equipment, would magnify the inaccuracy of flange contour. Thirdly, this method is only effective for slight tapers and complex tapers are difficult to produce.

These disadvantages are overcome in the present invention by providing a device employing compression forming techniques in which a stabilizing force is applied laterally to the beam while a compressive force is applied longitudinally to the beam by means of a ram. Application of the lateral force results in maintaining a constant beam cross section, although the web cross section increases under longitudinal compression. This feature increases the structural rigidity of the beam without increasing material weight.

The beam shaping device of the present invention makes possible the utilization of a standard extruded beam or channel. This extrusion can be tapered in any area desired and a comparatively sharp taper can be produced. Inasmuch as flange contour is shaped by compression, the flange contour is relatively easy to maintain and close tolerance does not pose a problem. The cross-sectional area of the beam is maintained constant during compression.

In one embodiment of the present invention, there is employed a pair of side members yieldably mounted in a channel portion of a base assembly. The side members are provided to maintain a stabilizing force on either side of a beam web during a compression operation. The lateral stabilizing force applied to the side members may be exerted by a spring means or for controlled action by hydraulic means. A set of compressible members is placed between the web and each side member so that the applied stabilized force prevents the web from collapsing. The compressible members are fitted between the upper and lower flanges of the beam and are resiliently constructed so that longitudinal compression is permitted. The compressible members are resiliently arranged so that force exerted on the flanges by means of a hydraulic or other suitably activated ram forces the compressible members to assume the shape of the flanges as determined by the shape of the ram. The compressible members may be a set of telescoping interlocking fingers or may take the form of resilient pressure bags or perforated rubber for example.

Both flanges of the beam may be tapered to any desired shape by providing a die platform beneath the lower flange and the base assembly. In this manner, the punch shapes the top flange according to its contour while the lower flange is shaped by the contour of the die platform. Also, a pair of co-acting rams, each shaped to a desired contour, may be employed for shaping both flanges.

It is the object of the present invention to provide a novel forming device for producing tapered structural members from simple extruded shapes which are lighter in weight and stronger than conventionally formed structural members.

It is another object of the invention to provide a simple and economical means for shaping beam structures.

It is a further object of the present invention to provide a novel forming means for shaping beams employing compression forming techniques.

It is a still further object of the invention to employ a novel forming device which utilizes a standard extrusion capable of being tapered in any area and which produces a comparatively sharp taper.

It is another object of the present invention to provide a novel beam shaping device which maintains a constant beam cross-sectional area during compression.

These advantages and objects will be seen more clearly with reference to the drawings in which:

Figure 1 is a front elevational view of a beam forming device in accordance with the present invention;

Figure 2 is a fragmentary plan view of the device shown in Figure 1 taken along line 2—2 illustrating spring means for providing a stabilizing force to the beam web;

Figure 3 is a sectional view of a compressible member employed in the device of Figure 1 taken along line 3—3 showing the compressible member in the initial stage of a beam shaping operation;

Figure 4 is a sectional view taken along line 6—6 of Figure 4 showing a compressible member in a compressed state at the completion of a shaping operation employing a die platform to form the lower flange of the beam;

Figure 5 is another embodiment of the present invention featuring hydraulic control of the pair of side members which supports the web during operation and a pair of co-acting rams for forming both beam flanges;

Figure 6 is a fragmentary plan view of the embodiment shown in Figure 4 taken along line 6—6; and Figure 7 is an enlarged end view of a beam having its upper and lower flange tapered by the device of Figure 6 showing the web section shortened and thickened.

Referring to Figures 1, 2 and 3, a device is shown for shaping beams in accordance with the present invention. Force represented by an arrow 10 is applied to a shaped ram 11 from a suitable source (not shown) such as by a hydraulic system or pressure rollers. The ram is composed of a suitable solid piece of hardened tool steel and is provided with a taper 12 ground in accordance with the taper desired to be impressed upon a beam 13. Although the beam is shown in the shape of an I beam, it should be noted that other shapes and forms of elongate members may be used. The beam may be composed of suitable material for forming such as aluminum which has a low yield strength.

The beam comprises a web section 14 separating an upper flange 15 and a lower flange 16. The lower flange is fitted into a groove 17 provided in a holder 18 in order to hold the beam in a proper position for forming.

Resistance to the applied force represented by arrow 10 is provided by a base assembly 19 on which the holder is placed. The base assembly is rectangular in shape, extending parallel in relation to the longitudinal axis of the beam and holder and is composed of suitable material having its yield strength in excess of the beam material. An open channel 20 is provided in the base assembly in which the beam is located and is defined by base assembly walls 21 and 22 respectively. These walls extend along the entire length of the base assembly. The base assembly is mounted on a base support 23 which provides support to the base assembly and additional resistance to the applied force during a forming operation.

External braces such as braces 24 are employed to support the base assembly walls during the forming operation. The braces are attached to the base support by means of bolts such as bolt 25 and are fixed to the base assembly walls by any suitable means such as welding.

During a forming operation, applied force to the upper and lower flanges 15 and 16 of the beam causes a decrease in web height and an increase in web thickness as shown in Figure 7. To prevent the web from buckling, two sets of interlocking fingers 26 and 27 are provided. One set is provided on each side of the web and is machined specifically to fit between the upper and lower flanges adjacent the web of the beam. Each set of interlocking fingers comprises a pair of finger bars 28 and 29, shown more clearly in Figure 3, having a plurality of finger members such as finger member 30 separated by a gap 31. The finger bars are coupled together by means of helical springs 32 and 33 mounted between the finger bars on opposite ends thereof. Guide holes such as holes 34 and 35 are provided in the finger bars to receive a guide post 36 which extends longitudinally through the center of the helical spring. The fingers are cut perpendicular to the longitudinal axis of the beam but upon compression the finger may form an arc pivoted at one end. During compression, these interlocking fingers break up the unsupported area of the web into the smallest possible sections so that buckling is avoided.

It should be noted that the embodiment of Figure 1 is not limited to the use of interlocking fingers since any suitable compressible means such as hydraulic pressure bags or perforated rubber may be used.

Adjacent the sets of interlocking fingers and engageable therewith, there is provided a pair of resiliently mounted side members 37 and 38. Buffer plates 39 and 40 are carried on each side member and are engageable with the interlocking fingers. The movable side members are coupled to the base assembly walls 21 and 22 respectively by means of a bolt and nut arrangement as indicated by the numerals 41 and 42. Between the base assembly walls and the side members supported by the bolt and nut arrangements, a spring mechanism 43 is located whose tension is directed toward forcing the side members away from the base assembly wall to which the side members are connected. During operation, the spring mechanisms provide a stabilizing force against the compressible members to prevent the beam web from collapsing and yet allow the web to thicken.

In Figure 4 a taper is formed in the lower flange of the beam in addition to the upper flange by providing a die platform 45 between the holder and the base assembly. Application of compressing force will cause the upper flange to assume the shape of the ram while the lower flange assumes the shape of the die platform. This figure shows the telescoping and interlocking action of the finger members of the finger bars when force is applied to the flanges. Both the upper and lower flanges are tapered to form one end of the beam. Spring 33 compresses in accordance with the application of pressure to form the taper. Sharp tapers may be obtained by providing wider gaps in finger bar 29 so that the pivoted fingers will have an arc of greater radii in which to travel.

In the apparatus of Figures 5 and 6 another embodiment of the present invention is shown which provides a pair of shaped rams 50 and 51. The pair of rams are arranged so that their coaction causes the engagement of their shaped surfaces with the upper and lower flanges of the beam. Compressible members fitted between the upper and lower flanges of the beam may take the form of the compressible members shown in the apparatus of Figure 1 but as shown in the present figure, take the form of perforated rubber 52.

The rams are activated by means of a piston 53 within a cylinder 54 located in a suitable base assembly 55 and 56.

Suitably arranged within base assembly 55, a plurality of cylinders such as cylinder 56 is provided for a piston 57 and a rod 58 arrangement which are hydraulically activated by hydraulic fluid supplied by lines 59 and 60 from a source (not shown). The hydraulic system affords more precise control over the applied lateral force exerted to the compressible members via side members 37 and 38.

Fig. 7 shows a beam having its lower flange formed by employment of a die platform or by the co-acting rams shown in Figure 5 and illustrates the thickened web section represented by the numeral 61.

Actual operation is described in reference to Figure 1 in which beam 13 is placed into groove 17 in holder 18. The compressible interlocking finger bars 26 and 27 are fitted between the flanges of the beam. The beam including the compressible finger bars and holder are placed on base assembly 19 between side members 37 and 38. Pressure plates 39 and 40 engage the interlocking fingers due to the resilient action of spring mechanisms such as spring 43 compressed between side wall 21 and side member 37. Ram 11 is lowered into position to engage upper flange 15 of the beam. High pressure 10 is applied to the ram which causes the beam to be compressed between the ram and the base assembly. As compression continues the flanges of the beam are pressed together to form the desired taper ground on the surface of the ram. Compression of finger bars 28 and 29 against the tension of spring 33 causes the finger members 30 to engage and interlock. The web of the beam is sufficiently supported by the compressible finger bars so that buckling is prevented. As the web is compressed the beam material flows to thicken the web section under compression. By employing the interlocking fingers means shown in Figure 3 the web of the beam is supported but allowed to thicken. The thickened section of the web forces the interlocking fingers against the adjacent side members and against the tension of the spring mechanisms 43 supplying lateral support to side members. Lateral support is given, during the compressing operation, by base assembly walls 21 and 22 supported by a plurality of braces such as brace 24 mounted on the base support 23.

Having described only typical forms of the invention, we do not wish to be limited to the specific details herein set forth, but wish to reserve to ourselves any variations or modifications that may appear to those skilled in the art and fall within the scope of the following claims.

We claim:

1. A device for shaping a beam having a pair of flanges connected by a web section, the combination comprising, a base assembly for supporting of the beam having a channel, the channel being defined by a pair of wall sections carried on the base assembly and adaptable to receive the beam, compressible means disposed between the pair of flanges on at least one side of the web section and engageable with the flanges and web, the compressible means compressing in response to the shaping of the beam, at least one side member yieldably mounted on each wall section forcing against the compressible means, and a ram in spaced relationship to the base assembly having a face adaptable to engage at least one beam flange and inclined with respect to the longitudinal axis of the beam to shape the beam.

2. In a device for tapering a beam having a pair of flanges separated by a web the combination comprising, a base assembly supporting the beam having an open channel, lateral pressure means carried by the base assembly within the channel to converge toward the beam, compressible means placed between the flanges separating the web of the beam and the lateral pressure means to resist lateral deflection of the web responsive to web compression, compressing means in spaced relationship with respect to the base assembly for determining the slope of the flanges, and the lateral pressure means adapted to laterally converge against the compressible means while the flanges are shaped.

3. In a device for shaping a beam having a pair of flanges separated by a web comprising, the combination of a base assembly having an open channel, a pair of side members resiliently mounted on the base assembly within the channel to converge laterally toward the beam, the beam being receivable between the pair of side members and supported on the base assembly, a pair of compressible members placed adjacent the web of the beam and between the pair of flanges, each compressible member comprising a plurality of extended interlocking fingers resiliently related to engage when compressed responsive to beam compression, and compressing means in spaced relationship with respect to the base assembly arranged to pass into the open channel to forcibly engage the beam compressing the beam web for determining the contour of the flanges of the beam.

4. A forming device for contouring a beam, the combination comprising, a base assembly supporting the beam having an open channel extending longitudinally therewith, a pair of side members mounted on the base assembly within the open channel and one side member separated from the other side member by the beam, a plurality of springs fixed between each side member and the base assembly urging each side member toward the beam, the beam comprising a web separating an upper and a lower flange, compressible means disposed between the upper and lower flanges adjacent the web and each side member comprising a first finger bar and a second finger bar resiliently coupled to engage when compressed responsive to slope determination of the flanges, the first and second finger bars being arranged so that compression allows the fingers of each bar to telescope and interlock, a pair of shaped rams arranged in spaced relationship to the base assembly and forcibly engageable with the upper and lower flange to compress the beam web for determining the slope of the flanges, and a press means for exerting pressure to the rams.

5. In a device for shaping a beam having a pair of flanges separated by a web section, the combination comprising, a base assembly supporting the beam having an open channel to receive the beam, a pair of parallel wall sections integrally formed in the base assembly defining the open channel, compressible members disposed adjacent the web of the beam and the pair of flanges which conform to the shape of the beam cross section, a side member yieldably mounted on each wall section within the channel and engageable with the compressible members, biasing means carried on each wall section forcibly engageable with each side member to urge the compressible members into conformity with the shape of the beam cross section, and a shaped ram arranged in spaced relationship to the base assembly adaptable to travel between the wall sections into forcible engagement with the beam to shape the beam and compress at least a portion of the compressible members.

6. In a device for shaping a beam having a pair of flanges separated by a web section, the combination comprising, a base assembly supporting the beam having an open channel to receive the beam, a pair of parallel wall sections integrally formed in the base assembly defining the open channel, compressible members disposed adjacent the web of the beam and the pair of flanges which conform to the shape of the beam cross section, side members yieldably mounted on each wall section within the channel and engageable with the compressible members, reciprocating mounting means connecting the side members to each wall section, biasing means carried on the mounting means disposed between each wall section and its respective side member forcibly engageable with each side member to urge the compressible members into conformity with the shape of the beam cross section, and a shaped ram arranged in spaced relationship to the base assembly adaptable to travel between the wall sections into forcible engagement with the beam to shape the beam and compress at least a portion of the compressible members.

References Cited in the file of this patent

UNITED STATES PATENTS

| | | |
|---|---|---|
| 671,536 | Carliss | Apr. 9, 1901 |
| 671,537 | Carliss | Apr. 9, 1901 |
| 672,769 | Holme | Apr. 23, 1901 |
| 930,460 | Davis | Aug. 10, 1909 |
| 1,012,334 | Davis | Dec. 19, 1911 |
| 1,633,970 | Ball | June 28, 1927 |
| 1,657,350 | Ellis | Jan. 24, 1928 |
| 1,761,887 | Junkers | June 3, 1930 |
| 1,808,467 | Langford | June 2, 1931 |
| 2,302,115 | Gazey | Nov. 17, 1942 |
| 2,350,060 | Montgomery | May 30, 1944 |
| 2,369,486 | Nivison | Feb. 13, 1945 |
| 2,390,274 | Rose | Dec. 4, 1945 |
| 2,390,803 | Marschiner | Dec. 11, 1945 |
| 2,544,447 | Dodds | Mar. 6, 1951 |
| 2,670,779 | Mowrey | Mar. 2, 1954 |
| 2,693,637 | Peabody | Nov. 9, 1954 |
| 2,729,265 | Jones | Jan. 3, 1956 |